July 10, 1956 K. S. DUNLAP ET AL 2,754,368

TELEPHONE SYSTEM

Filed May 3, 1952 3 Sheets-Sheet 1

INVENTORS: K. S. DUNLAP
E. B. FERRELL

BY

ATTORNEY

INVENTORS: K. S. DUNLAP
E. B. FERRELL
BY
ATTORNEY

July 10, 1956 K. S. DUNLAP ET AL 2,754,368

TELEPHONE SYSTEM

Filed May 3, 1952 3 Sheets-Sheet 3

INVENTORS: K. S. DUNLAP
E. B. FERRELL

BY

ATTORNEY

United States Patent Office 2,754,368
Patented July 10, 1956

2,754,368

TELEPHONE SYSTEM

Kermit S. Dunlap, Madison, and Enoch B. Ferrell, Chatham, N. J., assignors to Bell Telephone Laboratories, Incorporated, New York, N. Y., a corporation of New York Application May 3, 1952, Serial No. 285,948

15 Claims. (Cl. 179—17)

This invention relates to telephone systems and more particularly to such systems wherein a number of subscriber instruments are connected to a central office by common lines.

At the present time a considerable number of telephones, particularly in rural or suburban areas, have telephone service on what is known as a party line basis, in which several, such as four or six, telephones are all connected to the central office by the same line. While this is a generally satisfactory arrangement where traffic loads are relatively light, there is some dissatisfaction on the part of the subscribers over sharing their telephone service with other subscribers. However, the cost of installing private wires from the central office to the subscribers' homes obviously would be considerable and necessitate relatively large mileage charges to the subscribers.

It is an object of this invention to upgrade the telephone service given to a number of subscribers on a party service.

It is another object of the invention to reduce the mileage of wire, and hence the amount of conductor necessary and the cost, per subscriber, for an increased grade of service.

It is a further object of this invention to simplify the central office equipment required to increase the grade of service of multiparty line subscribers.

It is a still further object of this invention to enable the addition of new subscribers to multiparty lines with no impairment in the grade of service being given.

These and other objects of this invention are attained in accordance with features of this invention by providing two trunks between the multiparty subscribers and the central office. One of these trunks is the normal or party trunk over which the ringing currents will pass and to which all the subscribers are connected when their instruments are idle, as is the normal condition. The other trunk is a private or preferred trunk to which a subscriber is transferred when calling or being called, provided it is not being utilized for a prior call. In accordance with a feature of this invention, the subscriber will be transferred to the preferred trunk whenever that trunk becomes idle, even though that may occur in the middle of a call started over the party line. When on the preferred trunk, the subscriber is on a private line, equivalent to that employed for single party service.

The transferring of a subscriber from the normal or party trunk to the private or preferred trunk is accomplished by a transfer relay positioned in the vicinity of the subscriber's instrument, e. g. on the pole from which the drop wire runs, rather than by a concentrator in the central office or in another location central to a group of subscribers. The transfer relay is connected across the party trunk to operate on a reversal of polarity across that trunk, the relay being either a polar relay or connected by a polarized connection, as by diodes or varistors. The polarity reversal is attained by polarity reversing contacts positioned in the party trunk and actuated by a supervisory relay operated by microphone current flowing in the party trunk. On transfer to the preferred line, a second supervisory relay operated by the microphone current now flowing in that trunk accomplishes a return of normal polarity in the party trunk. Contacts are also provided in each trunk for proper connection and interchange of the trunks and the central office switching terminals to assure that no calls are interrupted by the transfer of subscribers to the preferred trunk and also to assure that the line circuit of an idle switch terminal is never bridged across a busy trunk.

It is therefore a feature of this invention that a telephone system for multiparty subscribers comprise a pair of trunks from the central office to the subscribers, the trunks comprising a normal or party trunk to which all subscribers are normally connected and a preferred or private trunk to which a subscriber is transferred if that trunk is not being used.

It is a further feature of this invention that means be provided to transfer a subscriber to a preferred trunk even during the progress of a call. Further in accordance with this feature of this invention, the means comprises a relay actuated by reversal of polarity in the party trunk and positioned in the vicinity of the subscriber's instrument, either on the pole from which his drop line extends or on his premises.

It is a still further feature of this invention that supervisory relays be positioned in the two trunks to control the operation of the polarity reversal contacts and the trunk-terminal interchange contacts on the flow of microphone current in the trunks.

Further it is a feature of this invention that the trunks be parallel during the switching operation to avoid the opening of a busy trunk but that the switching assure that the unused central office terminal is never bridged across a busy line. More particularly, in accordance with this feature of the invention, a particular arrangement of contacts of a W–Z relay pair is employed to interchange the trunk-terminal connections on actuation by the supervisory relays.

Further it is a feature of this invention that the system when idle will return to its normal condition regardless of its last previous condition.

It is a still further feature of this invention that means be provided to prevent interruption of the ringing signal if after the ringing signal is initiated a call in progress on the preferred trunk terminates during the ringing. More specifically, it is a feature of this invention that a ground be provided to prevent release of the W–Z relay pair on cessation of microphone current in the preferred trunk if the central office equipment has seized the party trunk, as when a ringing signal is present.

A complete understanding of this invention and of these and other features thereof may be gained from consideration of the following detailed description and the accompanying drawing, in which.

Figure 1:
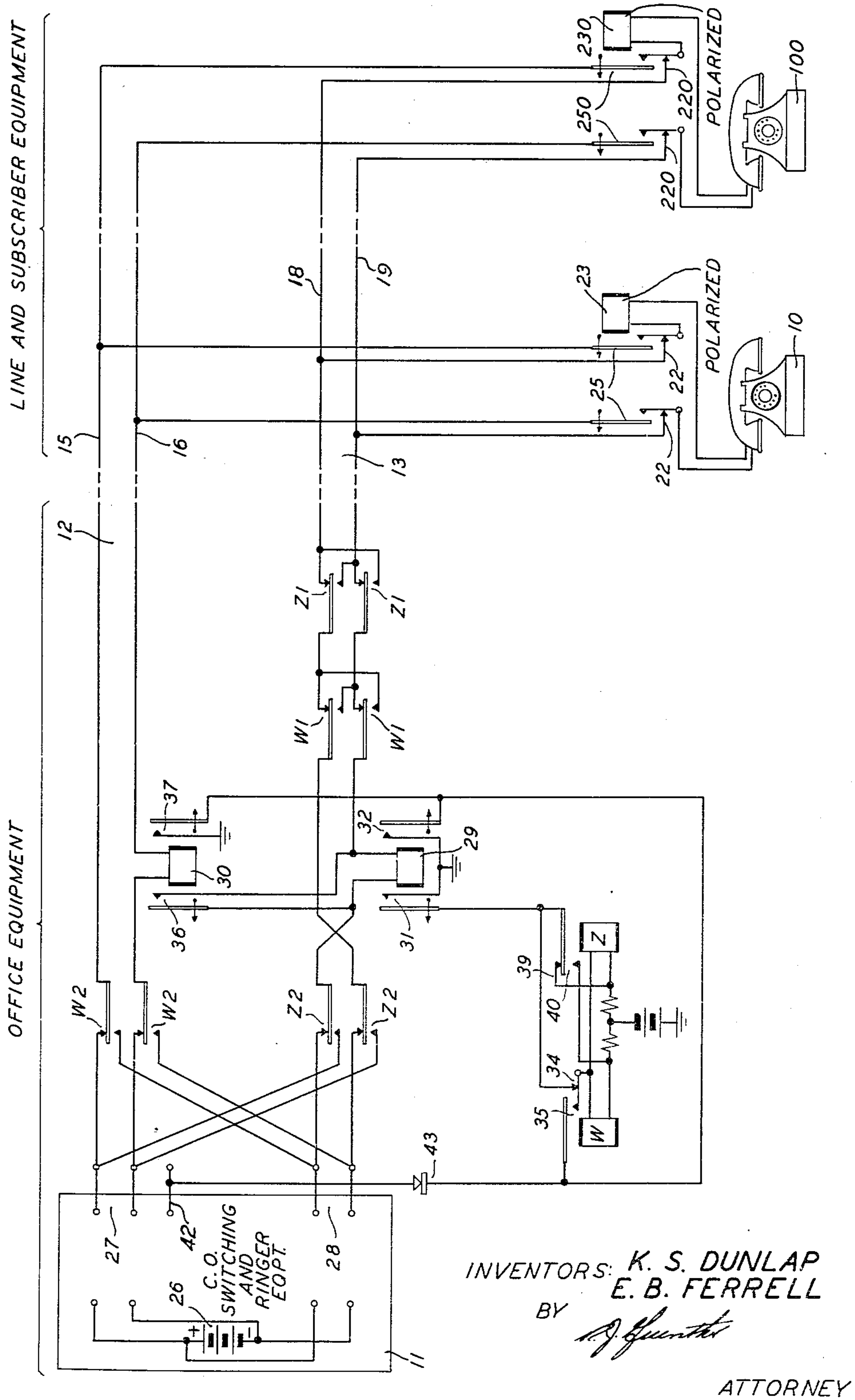
Fig. 1 is a schematic representation of one specific embodiment of this invention.

Referring now to the drawing, Fig. 1 shows a telephone system wherein a number, such as eight, subscriber instruments 10 are connected to a central office 11 by a pair of trunks 12 and 13, in accordance with this invention. The preferred or private trunk 12 comprises a pair of wires 15 and 16 and the normal or party trunk 13 a pair of wires 18 and 19. The instruments 10 are normally connected across the wires 18 and 19 of party trunk 13 through contacts 22 of a slow release polarized relay 23, the relay being polarized so that the normal polarization of the trunk 13 will not effect operation of the relay. Contacts 25 of the relay 23 which connect the instrument 10 to the preferred trunk 12 are normally open when the trunk group is idle. The normal polarization of the trunks is provided by some voltage source, such as a battery 26, located in the central office and connected across the switch terminals 27 and 28 of the central office switching and ringing equipment, preferred trunk 12 being normally connected to switch terminals 27 and party trunk 13 being normally connected to switch terminal 28. As indicated in Fig. 1, in this specific embodiment, wires 15 and 18 are normally maintained at a higher potential than wires 16 and 19, respectively.

The polarity of the wires 18 and 19 of party trunk 13 can be changed by operation of the polarity reversal contacts W1 or Z1, operated by relays W and Z, as described further below. Similarly, reversal of the switch terminals 27 and 28 to which the trunks 12 and 13 are connected is attained by operation of the contacts W2 and Z2, also operated by the relays W and Z, respectively. As indicated in the drawing, the contacts W2 normally connect the preferred trunk 12 to the switch terminal 27 and the contacts Z2 normally connect the party trunk 13 to the switch terminal 28.

Positioned in series in the wire 19 of the party trunk 13 is the winding of a slow release supervisory relay 29 responsive to microphone currents flowing in the trunk 13. Similarly, the winding of a slow release supervisory relay 30 is positioned in the wire 16 of the preferred trunk 12 and is responsive to the flow of microphone currents in that trunk. The contacts of the relay 29 and 30 control the operation of the relays W and Z, as described further below.

A general understanding of our invention can best be attained from a description of the operation of the specific telephone system disclosed in Fig. 1, which system is illustrative of the various embodiments that may be devised without departing from the scope of the invention. Further description of circuit elements can also most advantageously be postponed until their occurrence in the sequence of operation in the novel system. As pointed out above, when the group is idle all the subscriber instruments 10 are connected to the normal or party trunk 13 which is connected to the switch terminal 28 in the central office. In this idle condition, any subscriber can originate a call and the central office can terminate a call on its first choice, switch terminal 28, and ring any subscriber, all subscriber ringing equipment being associated with the normal trunk 13. Let us consider the operation of the system when a subscriber initiates a call. When he lifts his instrument, the microphone current flowing in wire 19 will cause supervisory relay 29 to operate, closing its contacts 31 and 32. The closing of contacts 31 will operate the W relay of the W—Z relay pair but not the Z relay, as there will be ground connections to both sides of the Z relay winding. The operation of the W relay will cause its contacts 34 to open while simultaneously closing its contacts 35, will reverse the position of the contacts W1 in trunk 13, and will also reverse the position of the contacts W2 in trunk 12.

Considering for a moment the reversal of the contacts W1 alone, the effect of the operation of the W relay is to reverse the polarity of the potential existing between the wires 18 and 19. Thus whereas wire 19 was priorly more positive than wire 18, upon operation of relay W, wire 18 becomes more positive. Upon reversal of the polarity of the wires of trunk 13, the polar relay 23 will open the back contacts 22 and close the front contacts 25, thereby transferring the subscriber from the party trunk 13 to the preferred trunk 12. The contacts 22 and 25 are advantageously bridging or continuity contacts. As the polarity on trunk 12 is normally the reverse of that on trunk 13, i. e., wire 15 is normally at the higher potential, the system will remain at this stable condition with relay 23 operated and instrument 10 connected to trunk 12, as long as any microphone current flows through the winding of relay 23. Relay 23 is advantageously a slow release relay so that this connection is not lost during dialing or flashing.

When microphone current flows in preferred trunk 12, due to the transfer of the instrument 10 to that trunk, it causes operation of the supervisory relay 30 whose coil is connected in wire 16. Operation of relay 30 causes its contacts 36 and 37 to close. The closing of contacts 36 shorts out the coil of supervisory relay 29, thereby opening contacts 31 and 32. This change in contact position will cause relay Z to operate while still leaving relay W in its operated position. Operation of relay Z will cause its contacts 39 to open while closing contacts 40 and will reverse the position of contacts Z1 and Z2. The reversal of contacts Z1 will restore the normal polarity to wires 18 and 19 of party trunk 13.

As noted above, the operation of relays W and Z effected reversals of their contacts W2 and Z2. This interchanged trunk and switching terminal connections. Before the operation of relays W and Z the subscriber's instrument 10 was connected to terminal 28 through the trunk 13; after operation of the relays, due to this interchange, the instrument is still connected to switch terminal 28 but through trunk 12.

So long as the call continues on the preferred trunk 12, relay 29 is held inoperative, as its winding is shorted through the closed contacts 36 of relay 30, and thus no further transfers of calls for the party trunk 13 are possible. If relay 30 releases after a second call has been set up on trunk 13, i. e., if the subscriber making the first call hangs up while a second subscriber 100 is using his instrument, relay 29 is again operated which releases relay W, and the polarity on trunk 13 is again reversed. This will transfer the second customer from the party trunk 13 to the preferred trunk 12, due to operation of the relay 230, and the microphonic current then flowing in trunk 12 will again operate relay 30. This second operation of relay 30 will release relay Z and return the group to normal.

Thus in accordance with this invention, the first subscriber instrument is connected to the preferred trunk 12 and all other subscriber instruments are connected to the party trunk 13. While the first subscriber remains on the preferred trunk 12 he is on a private line and cannot be broken into by other subscribers, while the other subscribers on the normal trunk are connected on a multiparty basis, and a second call can thus be placed on the normal trunk 13. If two calls are up and the call on the party trunk 13 ends, a simple disconnect occurs without action by any relays associated with the group. However, if the call on the preferred trunk ends first, as described above, when its disconnect is complete the call on the party trunk is transferred to the preferred trunk even in the middle of a call.

Further in accordance with the invention, the line circuit of an idle switch terminal is never bridged across the call at any time and the interchange of trunks and switch terminals described above can be made without producing any shorts or any openings of the busy circuit. This is because the procedure for interchanging trunks and switch terminals is first to remove the preferred trunk from the idle switch terminal 27 and connect it to the busy terminal 28 when a call is transferred from the party trunk to the preferred trunk. The two trunks are then connected in parallel to the single switch terminal 28. After the call has been transferred to the preferred trunk, the party trunk is then removed from the busy terminal 28 and connected across the idle terminal 27. This switching is advantageously accomplished in this specific embodiment of the invention by connecting the preferred trunk to the terminal 27 through the back contacts of transfer springs on the W relay and connecting the party trunk to terminal 28 through the back contacts of transfer springs on the Z relay. The front contacts of the W transfer are connected to terminal 28 and the front contacts of the Z transfer are connected to terminal 27. Since the W relay always operates or releases before the subscriber is transferred to the preferred trunk and the Z relay operates or releases after the subscriber is transferred, the correct sequence of interchange is always preserved.

The holding ground on the W—Z relay pair is obtained through parallel front contacts 32 and 37 on the relays 29 and 30, respectively. This insures that when no call exists, no matter in what order the last call ended, the group returns to normal so that the office may find any customer on its first choice terminal 28.

The specific embodiment of the invention described above requires substantially no modification of standard central office equipment except as noted below; the telephone system is entirely compatible with standard central office equipment presently being employed. One slight change from usual procedure is, however, necessary for the situation in which the central office attempts to complete a call on the circuit defined by terminal 27 and the party trunk while a call exists on the circuit defined by terminal 28 and the preferred trunk, but, before the called party answers on the party trunk, the first call on the preferred trunk is completed and that trunk is released. Since neither trunk is now operated, the system wants to restore the normal trunk-terminal connections. Were this done the office would find itself ringing into the preferred trunk which has access to no subscriber ringing bells. To avoid this, holding ground for the W—Z relay pair is supplied from the sleeve 42 of terminal 27. This is done through an asymmetrical circuit element, such as a diode 43, so that, while the sleeve ground provided by the sleeve 42 can hold the W—Z relay pair, the ground from the relays 29 or 30 cannot ground the sleeve terminal in this situation.

Calls within the group can be handled in the telephone system on a revertive basis. If the group is idle the calling subscriber is immediately put onto the preferred trunk and gets a line finder on terminal 28. He dials a directing digit to identify that his is a revertive call, unless the central office equipment includes means for automatically determining that this is a revertive call, the complete number of the called party, and his own party digit. The central office connector goes to terminal 28, finds it busy, moves to terminal 27, seizes it, and rings the called subscriber on the party trunk 13. When the called party answers, the connector in the central office reverses the battery, thereby transferring him to the preferred trunk, finds itself now on open trunk, and releases. The call is held by the line finder. It should be noted that this reversal of the polarity of the party line 13 does not involve the contacts W1 or Z1 but is accomplished by central office equipment alerted by the fact that this is a revertive call.

If the calling party begins to dial a revertive call on the trunk 13-terminal 27 circuit because of the presence of another call on the trunk 12-terminal 28 circuit and during the dialing the call on the preferred trunk disconnects, then the revertive call will be transferred to the trunk 13-terminal 27 circuit, and terminal 28 will be idle. The revertive connector now finding terminal 28 idle can seize it and ring, thus setting up a revertive connection as described above. Thus if either terminal is idle, the idle terminal is connected to the party trunk and the called party can be rung. On answer, the called party is transferred to the preferred trunk, completing the revertive connection by the central office equipment.

If the revertive connector finds both trunks busy because of a second call in the ground, then the revertive call can be set up by standard revertive procedure. The line finder sends a busy tone to the calling subscriber. If the calling party is using the party trunk then it will become idle when the calling party hangs up and both parties can be rung. If the calling subscriber is using the preferred trunk and the party trunk is busy, then when the calling subscriber hangs up, the call on the party trunk is transferred to the preferred trunk. The party trunk is now idle and both parties can be rung.

Figure 2:
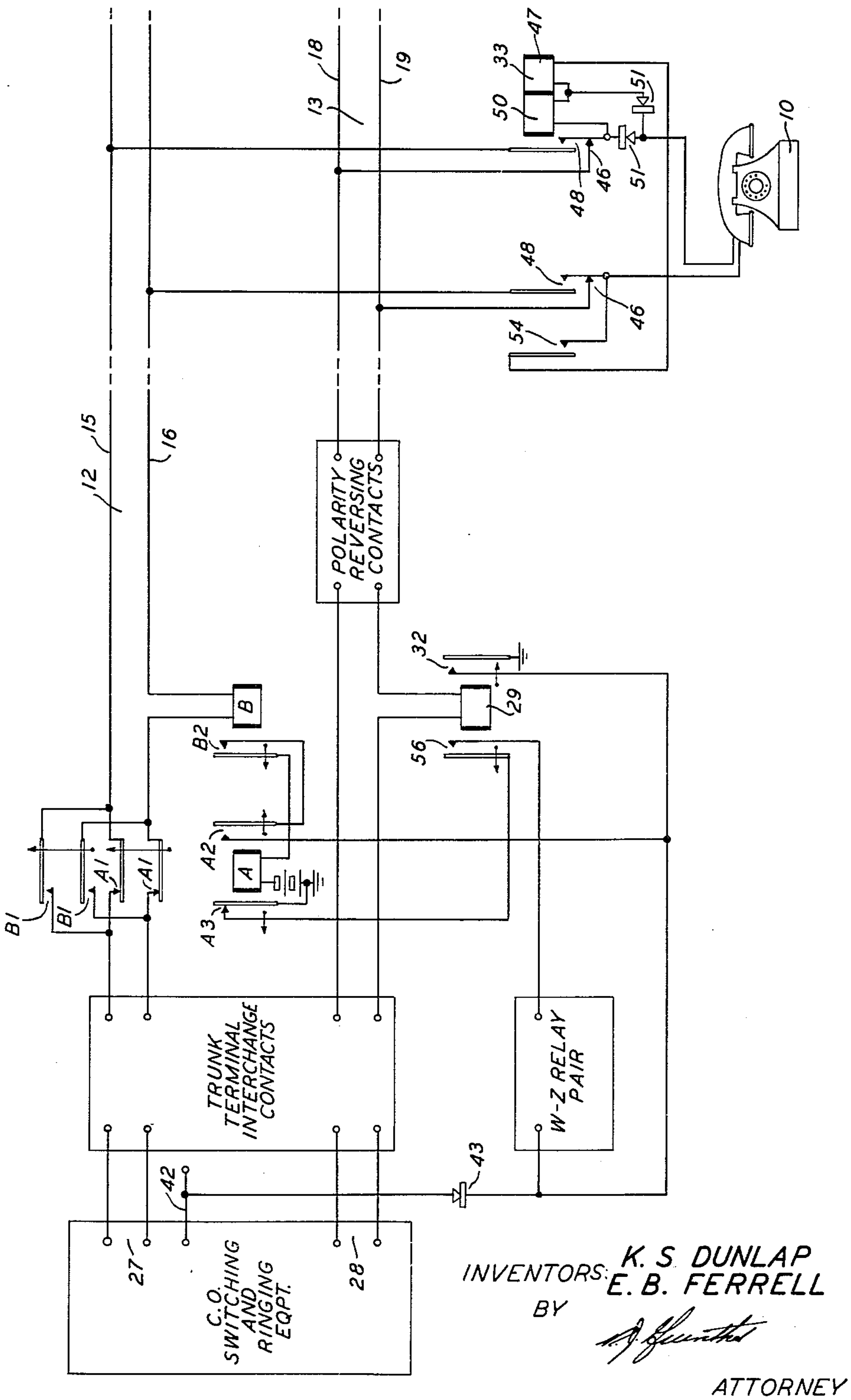
Fig. 2 is a schematic representation of another specific embodiment of a telephone system in accordance with this invention.

Various modifications can be made and various other specific embodiments devised by those skilled in the art without departing from the scope and spirit of this invention. One such other specific embodiment is disclosed in Fig. 2. In this embodiment, the subscriber's instrument is normally connected to the party trunk 13 through the contacts 46 of a transfer relay 47 and may be connected to the preferred trunk through the contacts 48 on operation of relay 47. Relay 47 has two windings, one winding 50 being a low impedance one connected to a pair of properly poled diodes 51 so that the relay does not respond to the normal battery polarity on the party trunk 13. The second winding 53 is a high resistance hold winding which is connected across the preferred trunk 12 by the closing of the contacts 54 on operation of the transfer relay 47. By employing a separate hold winding, rather than a slow release relay, release of the relay due to dialing breaks or flashing is less likely to occur. However, this requires that the preferred trunk be opened upon completion of the call to assure release of the transfer relay 47. This is attained by employing a slow release relay A operated on closure of contacts B2 of a supervisory relay B whose winding is positioned in wire 16 of the preferred trunk; relay B is therefore operated on the flow of microphone current in the preferred trunk in a manner similar to that of the operation of supervisory relay 30 in the specific embodiment of Fig. 1. As can be seen in the drawing, a pair of normally closed contacts A1 are located in wires 15 and 16 of the trunk 12 and a pair of normally open contacts B1 are connected in parallel thereto. On operation of supervisory relay B contacts B1 and B2 are closed operating relay A. Operation of relay A in turn opens contacts A1, but as contacts B1 have priorly closed trunk 12 is not interrupted. When the call is completed supervisory relay B will open, as microphone current no longer flows in wire 16, thereby opening contacts B1 and B2. However, as relay A is a slow release relay there will be a delay period after supervisory relay B has released while relay A is still operated. During this period, both sets of contacts A1 and B1 will be opened, thereby removing the voltage across the high impedance winding 53 of the transfer relay 47 permitting that relay to release.

This specific embodiment also incorporates another modification in the operation of the supervisory relays in applying pulses to the W—Z relay pair. In the previously described embodiment, operation of the supervisory relay 30 in the preferred trunk rendered the supervisory relay 29 in the party trunk inoperable by shorting its winding through the contacts 36 of relay 30. In this embodiment, operation of the supervisory relay 29 closes its contacts 56 thereby causing operation of the W relay by providing a path to ground through the normally closed contacts A3 of the relay A. However, upon transfer of the subscriber to the preferred trunk, and consequent operation of supervisory relay B and relay A, contacts A3 are opened thereby rendering ineffective any subsequent closing of the contacts 56.

The polarity reversing contacts need not be positioned on springs of the W—Z relay pair but may be contacts of the supervisory relays themselves, or may be contacts of other relays similarly operated by the supervisory relays. Advantageously, such separate relays would be high speed relays.

A telephone system in accordance with the invention may readily be utilized to make a very simple Community Dial Office. Thus if a community contains 250 customers, of whom 50 need one-party service and the remainder can accept the two party service or better attainable for 8 customers on a two-trunk telephone system in accordance with this invention as described further below, only a hundred lines need be employed, 50 individual lines and 50 lines forming 25 two-trunk groups. The office would then consist of a set of 100 point line finders, an equal number of 100 connectors, and, in each line between a line finder and a connector, a circuit to select the party ringing. Selective ringing, employing tuned reed selectors, could advantageously be employed in each two-trunk group. By utilizing telephone systems in accordance with our invention, the grade of service would be increased for a larger number of subscribers and the banks, line finder controls, and other central office equipment considerably simplified, with concomitant economies in both initial and operating expenses.

Further savings in copper and wire may be achieved if the preferred trunk comprises a simple carrier channel superimposed on the metallic pair that comprises the normal or party trunk. Such a carrier channel could operate in the 10 to 20 kilocycle range. The transfer of the subscriber from the party line to the preferred line would then require, besides the switching equipment positioned in the vicinity of the subscriber, either on an outside pole or on his premises, additional equipment to modulate the carrier. However, the considerable savings in copper and wire would counterbalance the expense for the additional carrier equipment.

Figure 3:
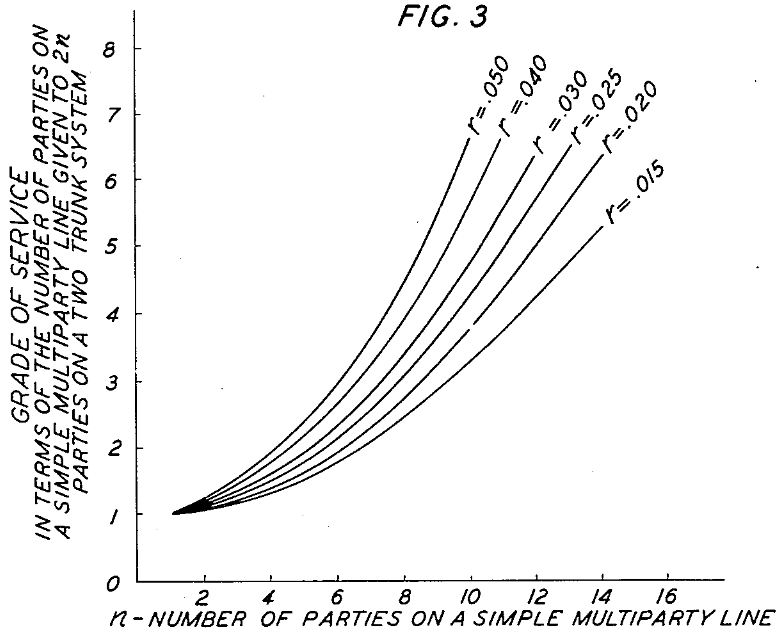
Fig. 3 is a graph indicating the upgrading of service attainable for a specific number of subscribers presently on a multiparty line by the employment of this invention.

The upgrading of telephone service for subscribers connected to a two-trunk telephone system in accordance with this invention can be seen clearly from a consideration of Fig. 3 wherein grade of service attainable by this invention is plotted against the number of parties on a simple multiparty line for various amounts of traffic, *r*, offered per party, the traffic being the sum of originating and terminating calls for each party and being measured in erlangs. One erlang represents a traffic load of a party using his instrument continuously for one hour and is thus equal to 36 c. c. s., where a c. c. s. is a call lasting a hundred seconds. A usual suburban home subscriber would be expected to have a traffic load of about 0.040 erlang, while a business line might have a traffic load of 0.1 erlang.

The grade of service indicated in Fig. 3 measures the service given to $2n$ parties connected on a two-trunk telephone system in accordance with this invention in terms of the equivalent service given to the number of parties $n$ indicated on a simple party line. Thus a grade of service of 3 means that the service given to $2n$ parties connected to a two-trunk telephone system is equivalent to that given to 3 parties connected to a simple multiparty line. This grade of service is plotted against $n$, the number of parties on a simple multiparty line. By calculating the grade of service in terms of $2n$, rather than just $n$, Fig. 3 illustrates another advantageous attainment of this invention in that substantially no additional copper wire is required to attain the results indicated in Fig. 3. Thus the four copper wires used by 8 customers on two four-party lines could be utilized for a single two-trunk telephone system in accordance with this invention and, for a typical suburban load of 0.040 erlang, the 8 customers, who priorly obtained a grade of service of 4 on two different lines would now be upgraded to a grade of service which could be described a 1.8 party service. Similarly, twelve subscribers who have been served on two six-party lines could be connected to one two-trunk system with a service comparable, for a traffic load of 0.020 erlang, to that given a two-party line. As pointed out hereinbefore the number of wires to the central office for two multiparty lines is the same as that for a single two-trunk system, regardless of the number of subscribers on the party lines, so that a minimum of additional copper wire is needed, depending on the geographical location of the individual subscribers.

Figure 4:
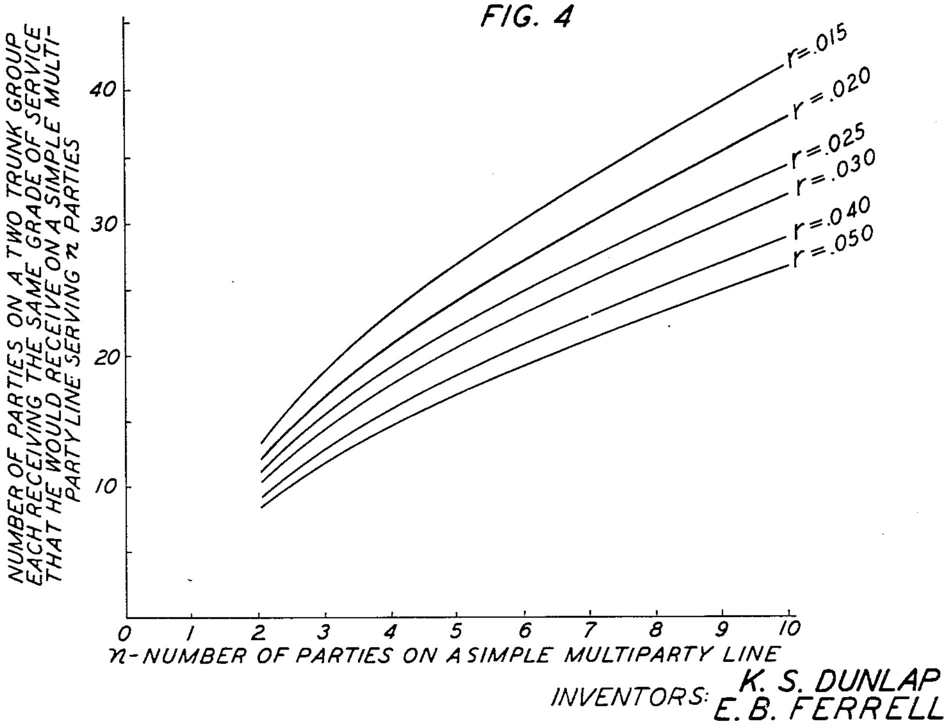
Fig. 4 is a graph indicating the increased number of subscribers that may be placed on a telephone system in accordance with this invention with no reduction in service.

While the above discussion has indicated the results attainable by the practice of this invention in upgrading the telephone service of a given number of subscribers presently on simple multiparty lines, it is often desirable to be able to increase the number of subscribers on a given line without decreasing the grade of service being given. Fig. 4 illustrates the results attained by employing this invention in the increase of subscribers without decreasing the grade of service. In this figure, the number of parties on a two-trunk system, in accordance with this invention, who receive each the same grade of service as he would on a simple multiparty line serving $n$ parties is plotted directly against the number of parties $n$ on a simple multiparty line for various traffic loads $r$. As can be seen, two six-party lines can be combined in a two-trunk system in accordance with this invention to offer six-party service to 20 telephone subscribers with no increase in the number of lines to the central office and substantially no increase in copper wire. Thus by employing this invention provision is made for eight more subscribers with no impairment of the service given to prior subscribers, with no additional lines to the central office, a minimum of additional copper wire, depending on the geographical location of the new subscribers, and with substantially no additional central office equipment.

While our system has been described with reference to but two trunks, it should be understood that it may advantageously be employed with additional trunks. Reasons of geography may make it advantageous to use a single preferred trunk and two party trunks, with half of the subscribers normally standing on each of these trunks but with the first call set up on either party trunk being transferred to the preferred trunk.

It is to be understood that the above-described arrangements are illustrative of the application of the principles of the invention. Numerous other arrangements may be devised by those skilled in the art without departing from the spirit and scope of the invention.

What is claimed is:

1. A telephone system comprising a party trunk and a preferred trunk, central office apparatus including a pair of terminals, means associated with each of a plurality of subscriber instruments for normally connecting said instruments across said party trunk, means actuated by flow of current in said party trunk to one of said instruments for connecting said one instrument across said preferred trunk, means actuated by flow of current in said preferred trunk to said one instrument for preventing transfer of another of said instruments to said preferred trunk, means connecting said trunks to said terminals, and means actuated by flow of currents in said trunks for interchanging the connections between said trunks and said terminals to assure continuity of the call of said one instrument.

2. A telephone system comprising a party trunk and a preferred trunk, means associated with each of a plurality of subscriber instruments for connecting said subscriber instruments to said party trunk, central office apparatus including a pair of terminals and means for applying a potential across each of said trunks, means connecting said trunks to said terminals, relay means responsive to current flowing in said party trunk to one of said instruments for changing the polarity of the potential across said party trunk, relay means actuated by said change of polarity for transferring said instrument from said party trunk to said preferred trunk, and relay means for interchanging said trunk and terminal connections when said subscriber is transferred to said preferred trunk to assure continuity of the call.

3. A telephone system comprising a pair of trunks, means for connecting a plurality of subscriber instruments to one of said trunks, central office equipment including a pair of terminals and means for applying a potential difference across said trunks, means for connecting one of said trunks normally to one of said pair of terminals and said other trunk normally to said other terminal, relay means associated with said one trunk and actuated by flow of microphone current in said trunk to one of said instruments for reversing the polarity of said trunk, relay means associated with each of said instruments for transferring said one instrument to said other trunk on reversal of polarity across said one trunk, relay means actuated by the flow of microphonic current in said other trunk for returning the polarity across said one trunk to normal and for preventing transfer of further subscribers to said other trunk while a first call is still on said one trunk, relay means for interchanging said trunk and terminal connections on transfer of a subscriber to said other trunk without interrupting the subscriber's call or applying an open central office terminal across the busy trunk, and means for returning said system to normal on completion of all calls.

4. A telephone system comprising a party trunk and a preferred trunk, a transfer relay associated with each of a plurality of subscribed instruments, said transfer relay having a first set of contacts normally connecting said instrument to said party trunk and a second set of contacts for connecting said instrument to said preferred trunk, means for preventing operation of said transfer relay on the normal polarity of said party trunk, central office apparatus including a pair of terminals and means for applying a potential across said trunks, the polarity across said preferred trunk being reversed from the normal polarity across said party trunk, a first supervisory relay in said party trunk and actuated by flow of current to said instrument in said party trunk, a second supervisory relay in said preferred trunk and actuated by flow of current in said preferred trunk, a first set of contacts in said party trunk operated on actuation of said first supervisory relay for reversing the polarity of said party trunk to operate said transfer relay and transfer said instrument to said preferred trunk, a second set of contacts in said party trunk operated on actuation of said second supervisory relay for returning the polarity of said party trunk to normal, relay means actuated by said supervisory relays for interchanging said trunk and terminal connections to assure continuity of the call, and means for preventing transfer of a second subscriber instrument to said preferred trunk while said first subscriber instrument is across said preferred trunk.

5. A telephone system comprising a party trunk and a preferred trunk, central office apparatus comprising a pair of terminals and means for applying potentials across said trunks, the normal polarity of the potential on said party trunk being reversed from that on said preferred trunk, a first pair of contact means for connecting said trunks to said terminals, a transfer relay associated with and in the vicinity of each of a plurality of subscriber instruments, said transfer relay having a first set of contacts for normally connecting said transfer relay and said associated instrument across said party trunk and a second set of contacts for connecting said transfer relay and said instrument across said preferred trunk on operation of said transfer relay, means preventing operation of said relay on the normal polarity of said party trunk, a first supervisory relay associated with said party trunk and actuated on flow of microphone current in said party trunk to an instrument across said party trunk, a first set of contacts in said party trunk and operated on actuation of said first supervisory relay for reversing the polarity of said party trunk, thereby actuating said transfer relay and transferring said instrument across said preferred trunk, a second supervisory relay associated with said preferred trunk and actuated on flow of microphone current in said preferred trunk to an instrument across said preferred trunk, a second set of contacts in said party trunk and operated on actuation of said second supervisory relay for returning the polarity of said party trunk to normal on transfer of said instrument to said preferred trunk, means for preventing actuation of said first set of contacts by operation of said first supervisory relay while said second supervisory relay is operated, and means for interchanging the connections between said terminals and said trunks on transfer of said instrument to said preferred trunk to assure continuity of said call and to prevent an unused central office terminal being bridged across a busy trunk, said last-mentioned means including a second pair of contact means, each of said second pair of contact means being closed on the opening of an associated one of said first pair of contact means.

6. A telephone system in accordance with claim 5 wherein said first and second sets of contacts and said first and second pairs of contact means are contacts of a pair of relays operated on operation and release of said first supervisory relay and operation and release of said second supervisory relay.

7. A telephone system in accordance with claim 5 wherein said transfer relay is a polarized relay.

8. A telephone system in accordance with claim 5 wherein said means for preventing operation of said transfer relay on the normal polarity of said party trunk includes a pair of unidirectional circuit elements connected between said transfer relay and said party trunk.

9. A telephone system in accordance with claim 5 wherein said means for preventing actuation of said first set of contacts by operation of said first supervisory relay while said second supervisory relay is operated includes a pair of contacts associated with said second supervisory relay and closing a short circuit across the winding of said first supervisory relay.

10. A telephone system in accordance with claim 5 wherein said means for preventing actuation of said first set of contacts by operation of said first supervisory relay while said second supervisory relay is operated includes a pair of contacts on said second supervisory relay connected between means operating said first set of contacts and ground and opened on operation of said second supervisory relay.

11. A telephone system in accordance with claim 5 wherein said transfer relay comprises also a hold winding connected across said preferred trunk on operation of said transfer relay, said system comprising also means for momentarily opening said preferred trunk on cessation of microphone current in said preferred trunk to release said hold winding.

12. A telephone system comprising a party trunk and a preferred trunk, central office apparatus including a first and a second terminal, means associated with each of a plurality of subscriber instruments for normally connecting said instruments across said party trunk, means actuated by flow of current in said party trunk to one of said instruments for connecting said one instrument across said preferred trunk, means actuated by flow of current in said preferred trunk to said one instrument for preventing transfer of another of said instruments to said preferred trunk while said first instrument is connected thereto, and means connecting said trunks to said terminals, said last-mentioned means comprising a first pair of contacts connecting said party trunk to said first terminal in their normal position and to said second terminal in their operated position and a second pair of contacts connecting said preferred trunk to said second terminal in their normal position and to said first terminal in their operated position, a W—Z relay pair, said first pair of contacts being actuated by said W relay and said second pair of contacts being actuated by said Z relay, means actuated by the flow of current in said party trunk for operating said W relay when no current flows in said preferred trunk to connect said preferred trunk to said first terminal, and means actuated by flow of current in said preferred trunk for operating said Z relay to connect said party trunk to said second terminal.

13. A telephone system comprising a party trunk and a preferred trunk, central office equipment including a first and a second terminal, means associated with each of a plurality of subscriber instruments for normally connecting said instruments across said party trunk, means actuated by flow of current in said party trunk to one of said instruments for connecting said one instrument across said preferred trunk, means actuated by flow of current in said preferred trunk to said one instrument for preventing transfer of another of said instruments to said preferred trunk while said first instrument is connected thereto, means connecting said trunks to said terminals, said last-mentioned means comprising two pairs of contacts connecting said trunks each to one of said terminals when in their normal position and to the other of said terminals when in their operated position, a relay pair, one of said pair of contacts being operated by one of said relays and the other of said pair of contacts being operated by the other of said relays, and means actuated by flow of current in first said party trunk and then said preferred trunk for actuating said relays in sequence, and means for returning said system to its idle condition on cessation of all calls in said system regardless of its last previous condition.

14. A telephone sytsem in accordance with claim 13 wherein said means for connecting said one instrument across said preferred trunk comprises means for applying potentials across said trunks, the polarity across said party trunk being normally reversed from that across said preferred trunk, a transfer relay associated with each of said instruments operable on reversal of polarity, means for preventing the operation of said transfer relay on the normal polarity of said party trunk, and means actuated by flow of current in said party trunk to said one instrument for reversing the polarity of said party trunk.

15. A telephone system comprising a party trunk and a preferred trunk, central office equipment including a pair of terminals, means associated with each of a plurality of subscriber instruments for normally connecting said instruments across said party trunk, means actuated by flow of current in said party trunk to one of said instruments for connecting said one instrument across said preferred trunk, means actuated by flow of current in said preferred trunk to said one instrument for preventing transfer of another of said instruments to said preferred trunk while said current flows in said preferred trunk, means connecting said trunks to said terminals, means actuated by said flow of currents in said trunks for interchanging the connections between said trunks and said terminals to assure continuity of the call to said one instrument, means for returning said system to its idle condition regardless of its previous condition on cessation of said flow of currents, and means for preventing the interchange of terminals to the system's idle condition on cessation of said flow of currents if a ringing signal is being applied to one of said terminals.

References Cited in the file of this patent

UNITED STATES PATENTS 2,431,692 Hersey ---------------- Dec. 2, 1947